US012493257B2

(12) United States Patent
Maeda

(10) Patent No.: US 12,493,257 B2

(45) Date of Patent: Dec. 9, 2025

(54) IMAGE FORMING APPARATUS

(71) Applicant: CANON KABUSHIKI KAISHA, Tokyo (JP)

(72) Inventor: Yasukazu Maeda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/628,054

(22) Filed: Apr. 5, 2024

(65) Prior Publication Data

US 2024/0337976 A1 Oct. 10, 2024

(30) Foreign Application Priority Data

Apr. 6, 2023 (JP) ................................ 2023-062240

(51) Int. Cl.

*G03G 15/00* (2006.01)

*G03G 15/20* (2006.01)

(52) U.S. Cl.

CPC ..... *G03G 15/5008* (2013.01); *G03G 15/2017* (2013.01); *G03G 15/2039* (2013.01); *G03G 15/2064* (2013.01); *G03G 15/757* (2013.01); *G03G 15/80* (2013.01)

(58) Field of Classification Search

None

See application file for complete search history.

(56) References Cited

U.S. PATENT DOCUMENTS 3,497,682 A * 2/1970 Groll ..................... H04M 15/04 377/67

9,431,940 B2 8/2016 Kameyama

2009/0257778 A1* 10/2009 Isobe ..................... G03G 15/50 399/167

2010/0239293 A1* 9/2010 Ishizaki ............ G03G 15/1615 318/625

2011/0242259 A1* 10/2011 Kubo ....................... B41J 2/471 347/224

2011/0243590 A1* 10/2011 Ito .......................... G03G 21/16 399/51

2015/0177656 A1* 6/2015 Yoshimura ............ G03G 15/80 399/33

2019/0079437 A1* 3/2019 Motoyama ....... G03G 15/04072

2020/0235681 A1 7/2020 Ohashi et al.

2022/0269204 A1* 8/2022 Takatsu .................. G03G 15/80

2025/0096715 A1* 3/2025 Itoh .................... G03G 15/5004

FOREIGN PATENT DOCUMENTS

JP 2006-313452 A 11/2006

JP 2015-104263 A 6/2015

* cited by examiner

*Primary Examiner* — Sevan A Aydin

(74) *Attorney, Agent, or Firm* — Venable LLP

(57) ABSTRACT

An image forming apparatus includes a first motor that drives an image forming unit and that includes a motor of a type that lacks a sensor for detecting a rotational position of a rotor of the first motor, and a second motor that drives a fixing unit. A control unit causes rotational driving of the second motor to start after completion of a first operation for detecting a rotational position of the first motor or a second operation for causing the rotor to rotate to a predetermined rotational position, such that an execution timing of the first operation or the second operation and a timing at which rotational driving of the second motor is started do not overlap.

10 Claims, 12 Drawing Sheets

IMAGE FORMING APPARATUS

BACKGROUND OF THE INVENTION

Field of the Invention

The present invention relates to an image forming apparatus.

Description of the Related Art

As a driving source of a rotating member used in an image forming apparatus, a sensorless motor (such as a DC brushless motor and a stepping motor) that lacks a sensor such as a Hall element for detecting a rotational position (rotational phase) of a rotor may be used. For a sensorless motor, in order to avoid a problem such as step-out or reverse rotation that may occur when the motor is started, a stop position of the rotor can be detected, and a startup process corresponding to the detected stop position can be performed (see, for example, Japanese Patent Laid-Open No. 2015-104263). Alternatively, a retraction operation, in which an excitation current is supplied in a predetermined excitation phase of the motor to rotate the rotor to a desired rotational position, may be performed.

Further, in the image forming apparatus, in order to shorten a first printout time (FPOT), a temperature adjustment operation of a fixing unit may be performed in advance as a preparation operation (pre-start operation) prior to starting the image forming (printing) (see Japanese Patent Laid-Open No. 2006-313452, for example).

However, in an image forming apparatus in which a sensorless motor is used as a driving source of a rotating member, when the above-described preparation operation is performed prior to starting image formation in order to shorten the FPOT, a power supply (low voltage power supply) may have an excessively large load current maximum value. This may occur when a starting rotation period of the fixing motor for driving the fixing unit overlaps with the execution period of a position detection operation or the retraction operation of the sensorless motor for driving the rotating member included in the image forming unit. This may lead to an increase in the cost of the circuitry constituting the low voltage power supply.

SUMMARY OF THE INVENTION

Accordingly, the present disclosure provides a technique for preventing a maximum value of a load current supplied by a power source from being excessively increased when a preparation operation for shortening the FPOT is performed in an image forming apparatus in which a sensorless motor is used.

According to one aspect of the present invention, there is provided an image forming apparatus comprising: an image forming unit configured to form a toner image on a sheet based on image data for image formation received from an external apparatus; a fixing unit configured to fix the toner image formed on the sheet onto the sheet; a first motor configured to drive the image forming unit, and comprising a motor of a type that lacks a sensor for detecting a rotational position of a rotor of the first motor; a second motor configured to drive the fixing unit; and a control unit configured to control the first motor and the second motor so as to perform, between when the image data is received until when image formation by the image forming unit is started, a first operation for detecting the rotational position of the first motor or a second operation for causing the rotor to rotate to a predetermined rotational position, and rotational driving of the second motor, wherein the control unit causes the rotational driving of the second motor to start after completion of the first operation or the second operation such that an execution timing of the first operation or the second operation and a timing at which the rotational driving of the second motor is started do not overlap.

Further features of the present invention will become apparent from the following description of exemplary embodiments (with reference to the attached drawings).

DESCRIPTION OF THE EMBODIMENTS

Figure 1:
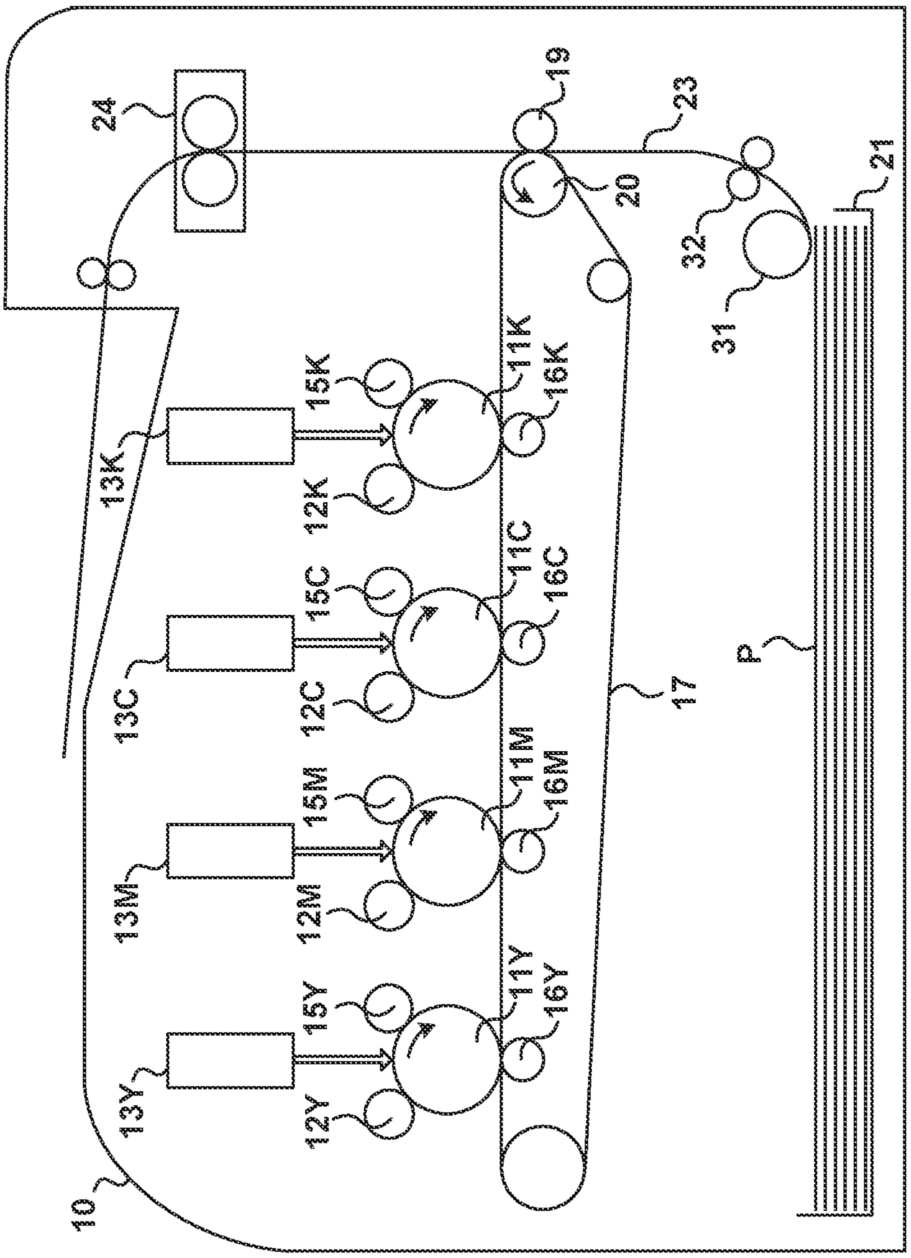
FIG. 1 is a cross-sectional view for illustrating an example of a hardware configuration of an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the embodiment of the present disclosure, a printing apparatus (printer) will be described as an example of an image forming apparatus. The embodiment of the present disclosure is also applicable to an image forming apparatus such as a copying machine, a multifunction peripheral, or a facsimile apparatus.

<Configuration of Image Forming Apparatus>

FIG. 1 is a cross-sectional view illustrating a hardware configuration example of an image forming apparatus according to an embodiment of the present disclosure. An image forming apparatus 10 overlays toner images of four colors, namely yellow (Y), magenta (M), cyan (C), and black (K) to form a full-color image. In FIG. 1, Y, M, C and K at the ends of reference numerals indicate that the colors of toner images that members denoted by the reference numerals are related to are respectively yellow, magenta, cyan, and black. Note that, in the following description, when it is not necessary to distinguish colors, reference numerals excluding Y, M, C, and K at the end are used.

The image forming apparatus 10 includes at least a photosensitive member 11, a charging unit 12, an exposure unit 13, a developing roller 15 (developing device), and a primary transfer unit 16 for each color of a toner image of a formation target. The image forming apparatus 10 further includes at least an intermediate transfer belt 17 (intermediate transfer member), a secondary transfer unit 19, a driving roller 20, a feed cassette 21, a conveyance route 23, and a fixing unit 24. The photosensitive member 11, the charging unit 12, the developing roller 15, the primary transfer unit 16, the intermediate transfer belt 17, and the secondary transfer unit 19 constitute an image forming unit that forms an image on a recording material P (sheet) fed from the feed cassette 21 and conveyed through the conveyance route 23.

The photosensitive member 11 is rotationally driven in a clockwise direction in FIG. 1 at a time of image formation. The charging unit 12 charges the surface of the photosensitive member 11 to a uniform potential. The exposure unit 13 forms an electrostatic latent image on the photosensitive member 11 by exposing the surface of the photosensitive member 11 with light based on image data of a formation target image. The developing roller 15 develops an electrostatic latent image of the photosensitive member 11 by a toner to visualize the electrostatic latent image as the toner image. The primary transfer unit 16 transfers the toner image formed on the photosensitive member 11, onto the intermediate transfer belt 17 by applying a primary transfer bias. Note that a full-color image is formed on the intermediate transfer belt 17 by transferring the toner images formed onto the respective photosensitive members 11 onto the intermediate transfer belt 17 in a superimposed manner.

The intermediate transfer belt 17 is rotationally driven by the driving roller 20 to rotate in a counterclockwise direction in FIG. 1. As a result, the toner image transferred to the intermediate transfer belt 17 is conveyed to a position opposite the secondary transfer unit 19. Meanwhile, the recording material P (the sheet) stored in the feed cassette 21 is fed in the conveyance route 23 and conveyed to a position opposite the secondary transfer unit 19 along the conveyance route 23. In the conveyance route 23, a conveyance roller for conveying the recording material P is disposed. The secondary transfer unit 19 transfers the toner image on the intermediate transfer belt 17 onto the recording material P by a secondary transfer bias. Thereafter, the recording material P is conveyed to the fixing unit 24. The fixing unit 24 fixes the toner image on the recording material P by applying heat and pressure to the recording material P. After the toner image is fixed, the recording material P is discharged to the outside of the image forming apparatus 10.

Figure 2:
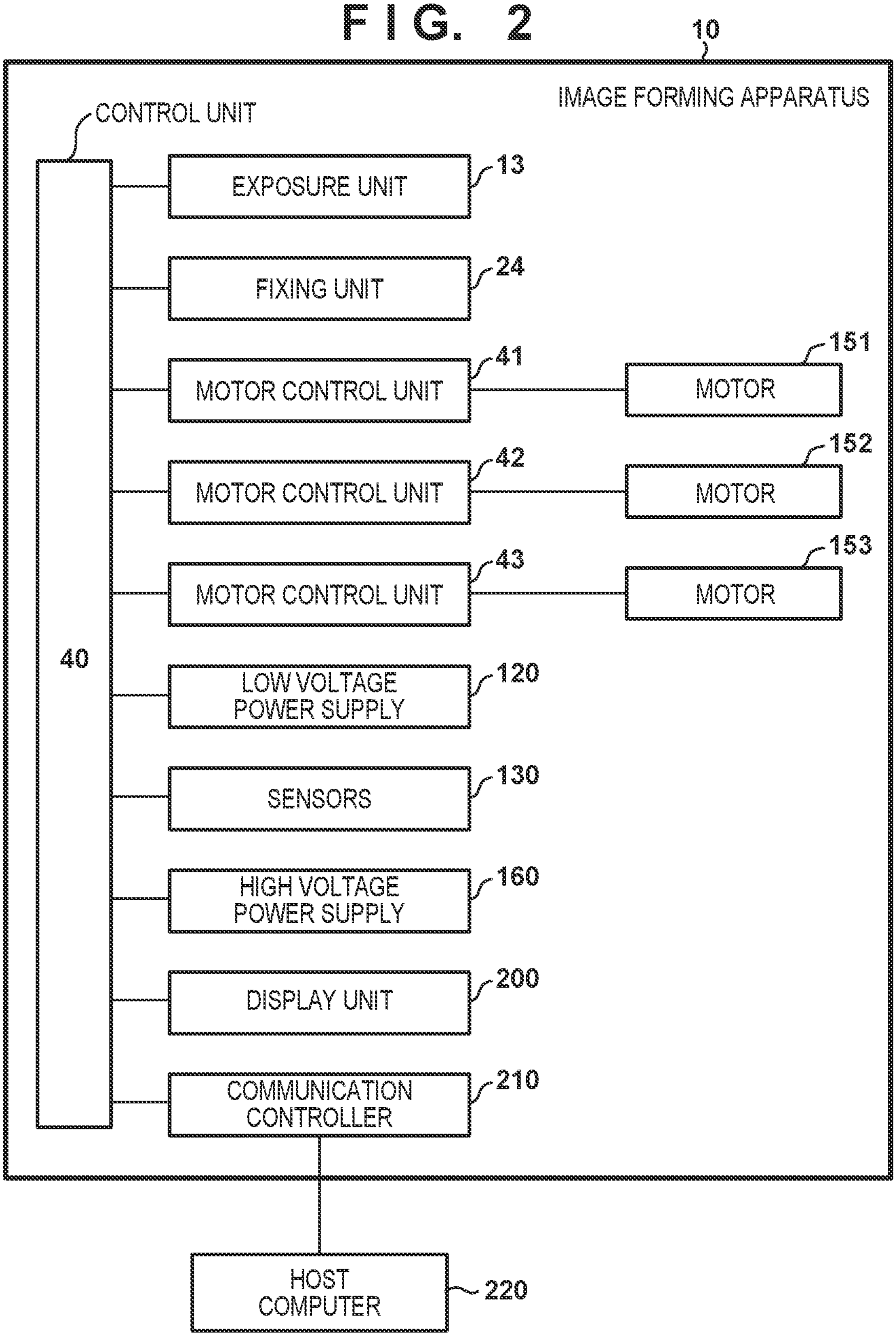
FIG. 2 is a block diagram for illustrating an example of a control configuration of the image forming apparatus.

FIG. 2 is a block diagram for illustrating an example of a control configuration of the image forming apparatus 10. As illustrated in FIG. 2, the image forming apparatus 10 further includes a control unit 40, a low voltage power supply 120, sensors 130, motors 151 to 153, motor control units 41 to 43, a high voltage power supply 160, a display unit 200, and a communication controller 210.

The motor control units 41 to 43 respectively control the motors 151 to 153 in accordance with instructions from the control unit 40. The motors 151 to 153 are used as driving sources of respective devices included in the image forming apparatus 10 as follows.

- A driving force of the motor 151 is transmitted to a paper feed roller 31 and a registration roller 32 via a gear mechanism (not illustrated). As described above, the motor 151 is used as a driving source of the conveyance roller for conveying the recording material P (sheet) along the conveyance route.
- A driving force of a motor 152 is transmitted to the image forming unit (the photosensitive member 11, the charging unit 12, the developing roller 15, the primary transfer unit 16, and the driving roller 20) via a gear mechanism (not illustrated). In this way, the motor 152 is used as a driving source of the image forming unit, which forms an image on a sheet conveyed through the conveyance route.
- A driving force of a motor 153 is transmitted to the fixing unit 24 via a gear mechanism (not illustrated). As described above, the motor 153 is used as a drive source (fixing motor) that drives (the fixing roller and the pressure roller included in) the fixing unit 24.

The control unit 40 includes a microcomputer (one or more processors) and a memory. The microcomputer controls each device in the image forming apparatus 10 based on various control programs and various data stored in the memory. The sensors 130 are a plurality of sensors for detecting the state of each device in the image forming apparatus 10, the state of the recording material P, and the like.

The low voltage power supply 120 outputs a lower voltage (DC voltage) than the high voltage power supply 160. The voltage outputted by the low voltage power supply 120 is supplied to each device for operation of each device in the image forming apparatus 10. For example, the voltage outputted by the low voltage power supply 120 is used to rotationally drive the motors 151 to 153.

The high voltage power supply 160 generates various types of bias voltages (for example, a charge bias voltage, a developing bias voltage, and a transfer bias voltage) necessary for image formation. The communication controller 210 communicates with an external apparatus such as a host computer 220. For example, the communication controller 210 receives image data for printing (for image formation) from the host computer 220.

The control unit 40 starts image formation for the recording material P based on received image data when it receives the image data of an image of a formation target from the host computer 220 via the communication controller 210. When the image formation is started, the control unit 40 controls the motor control units 41 to 43 to rotationally drive the motors 151 to 153. As a result, the control unit 40 controls the driving of the rotating member such as the photosensitive member 11 and the conveyance of the recording material P. The control unit 40 controls the exposure unit 13 to form an electrostatic latent image on the photosensitive member 11. The control unit 40 further controls the high voltage power supply 160 to output bias voltage for image formation to the charging unit 12, the developing roller 15, the primary transfer unit 16, and the secondary transfer unit 19. Further, the control unit 40 performs display control for displaying a screen such as a screen indicating the state of the image forming apparatus 10 on the display unit 200, and controls the sensors 130 for detecting the state of the recording material P or the image forming apparatus 10.

<Configuration of Motor Control Unit 42>

Figure 3:
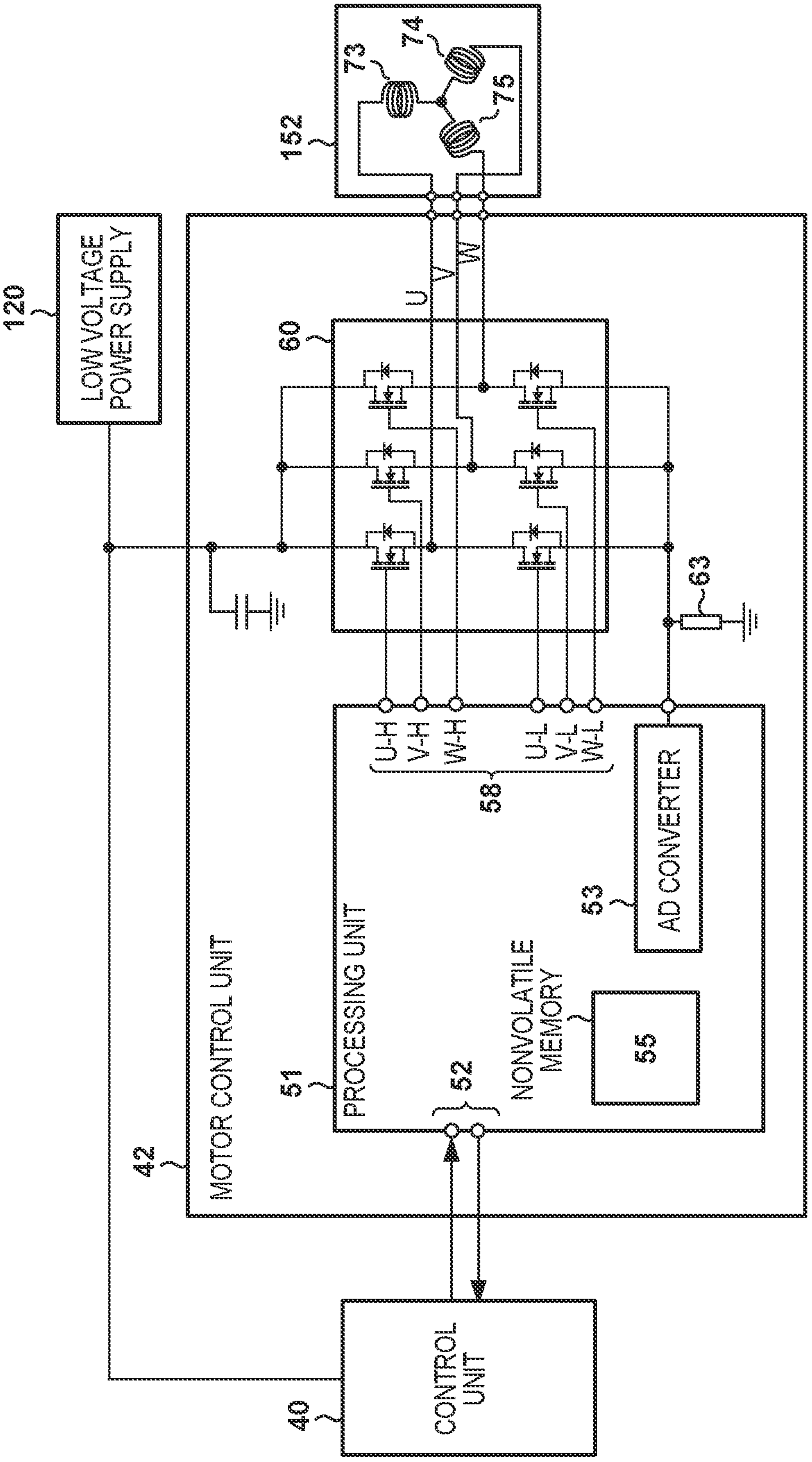
FIG. 3 is a block diagram for illustrating an example of a configuration of a motor control unit.

FIG. 3 illustrates a configuration example of the motor control unit 42 that controls the motor 152, which is used as a drive source of the image forming unit. In the present embodiment, the motor 152 is constituted by a sensorless DC brushless motor that lacks a rotor position detection sensor, and is used as a driving source for the image forming unit.

A motor control unit 41 includes a processing unit 51 and an inverter 60. The processing unit 51 is realized by a microcomputer or the like. The processing unit 51 includes a communication port 52 and a pulse width modulation (PWM) port 58. The processing unit 51 performs serial data communication with the control unit 40 via the communication port 52. The processing unit 51 outputs a PWM signal for driving the switching elements of the inverter 60 via the PWM port 58.

The inverter 60 is connected to the motor 152 to be controlled by the motor control unit 41. The motor 152 is a three-phase motor having three-phase (U-phase, V-phase, and W-phase) windings (coils) 73 to 75. The inverter 60 is a three-phase inverter composed of six switching elements including three switching elements on the high side corresponding to the U phase, the V phase, and the W phase, respectively, and three switching elements on the low side corresponding to the U phase, the V phase, and the W phase, respectively. In other words, the inverter 60 comprises switching elements at a high-side and low-side connected to the coil 73 of the U phase, switching elements at a high-side and low-side connected to the coil 74 of the V phase, and switching elements at a high-side and low-side connected to the coil 75 of the W phase. The switching elements of the inverter 60 are each configured by, for example, a transistor or an FET.

The PWM port 58 includes six terminals respectively corresponding to six switching elements of the inverter 60. In other words, the PWM port 58 includes terminals at the high-side and low-side corresponding to the U phase (a U-H terminal and a U-L terminal), terminals at the high-side and low-side corresponding to the V phase (a V-H terminal and a V-L terminal), and terminals at the high-side and low-side corresponding to the W phase (a W-H terminal and a W-L terminal).

The inverter 60 operates by receiving a DC voltage from the low voltage power supply 120. The three switching elements on the high side of the inverter 60 are examples of a plurality of switching elements respectively connected to the low voltage power supply 120 and respectively connected to different coils of the motor 152. The switching elements of the inverter 60 are each driven by a PWM signal outputted from corresponding terminals of the PWM port 58. By the PWM signal output from the PWM port 58, on and off of each switching element of the inverter 60 are controlled. Thus, a current for excitation flows from the inverter 60 to the coil 73 (U-phase), the coil 74 (V-phase), and the coil 75 (W-phase) of the motor 152. The processing unit 51 controls current which flows to each of coils 73 to 75 (the excitation current) by controlling on and off of each switching element of the inverter 60. As described above, the inverter 60 functions as an excitation unit that excites the coil to be excited among the plurality of coils 73 to 75 of the motor 152 by driving the plurality of switching elements (excites the excitation phase to be excited among the plurality of excitation phases of the motor 152).

A resistor 63 is used for detecting the excitation current supplied to each of the coils 73 to 75. Specifically, the excitation current supplied to each of the coils 73 to 75 is converted to voltage by the resistor 63. Voltage after conversion is input to an AD converter 53 of the processing unit 51. The AD converter 53 converts the input voltage to a digital value by performing analog/digital (A/D) conversion with respect to input voltage, and outputs the digital value as a value indicating a detection result of the excitation current. A non-volatile memory 55 functions as a holding unit for holding data to be used for processing by the processing unit 51 or the like.

<Configuration of Motor 152>

Figure 4B:
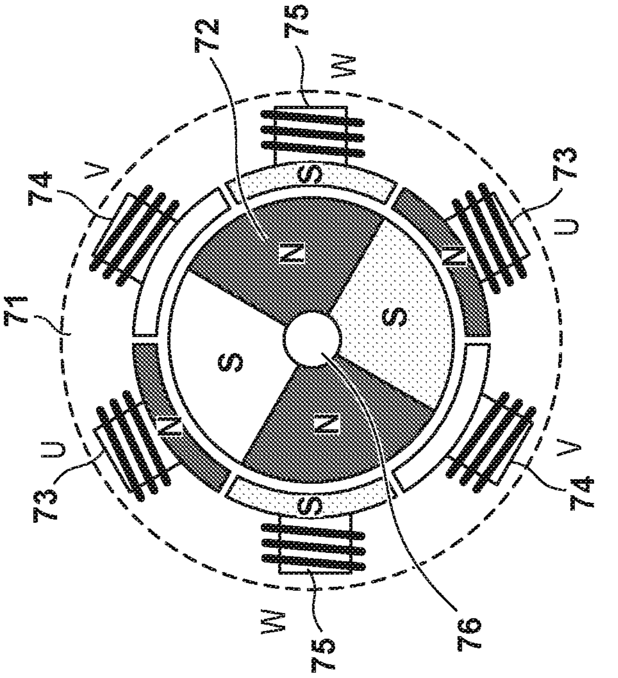
FIGS. 4A and 4B illustrate an example configuration of a motor.
Figure 4A:
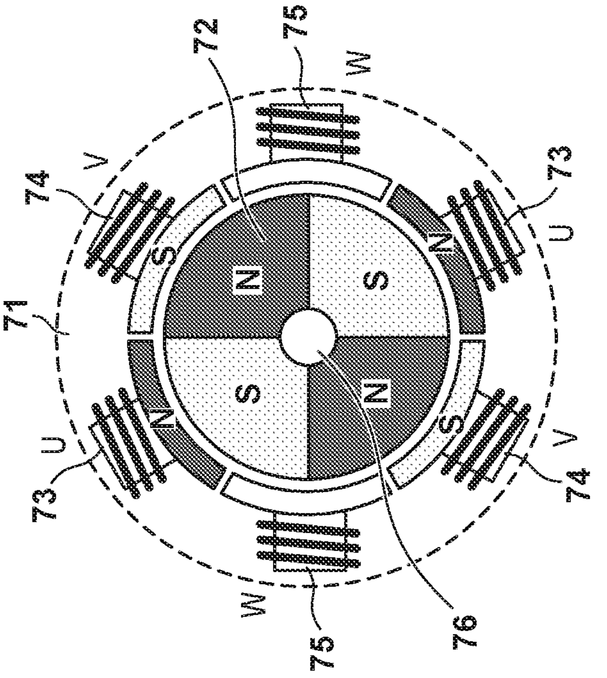

FIGS. 4A and 4B illustrate a specific example configuration of the motor 152. The motor 152 has a stator 71 of six slots and a rotor 72 of four poles. The stator 71 includes a U-phase coil 73, a V-phase coil 74, and a W-phase coil 75 as three-phase (U-phase, V-phase, and W-phase) coils, and the coils 73 to 75 are connected by a star connection. The coils 73 to 75 are divided into two slots each, and the coils of two slots are connected to each other by, for example, copper wires (not illustrated). The rotor 72 is composed of permanent magnets and has two sets of N pole and S pole. The rotor 72 is rotatable about a motor shaft 76.

In the present embodiment, there are total six excitation phases of U-V, U-W, V-U, V-W, W-U, and W-V as combinations (in other words, excitation phases) of excited coils among the coils 73 to 75. In the present specification, for example, "exciting the U-V phase" means that the inverter 60 is driven by PWM signal outputted from PWM port 58 to cause an excitation current to flow from the U-phase coil to the V-phase coil. When U-V phase is excited as described above, an excitation current flows from the U-phase coil 73 toward the V-phase coil 74, and at this time, the U-phase coil becomes the N-pole and the V-phase coil becomes the S-pole.

Generally, coils such as the coils 73 to 75 are configured by a copper wire wound around a core on which an electromagnetic steel plate is laminated. In addition, the magnetic permeability of the electromagnetic steel plate is reduced when an external magnetic field is present. Since the inductance of the coil is proportional to the permeability of the core, as the permeability of the core decreases, the inductance of the coil also decreases. Therefore, the amount of decrease in the inductance of the coil due to the influence of the external magnetic field varies according to the magnitude of the influence of the external magnetic field. Specifically, the larger the influence of the external magnetic field by the rotor 72, the larger the amount of decrease of the inductance of coils.

For example, in a case where the rotor 72 stops at the position illustrated in FIG. 4A, only the S poles of the rotor 72 face the U-phase coils 73, and both the S poles and the N poles (the middle portion between the S pole and the N pole) of the rotor 72 face the W-phase coils 75. In this case, the U-phase coil 73 is more influenced by the external magnetic field by the rotor 72 than the W-phase coil 75. Therefore, the amount of decrease in the inductance of the U-phase coil 73 is larger than the amount of decrease in the inductance of the W-phase coil 75.

The amount of change in the inductance of the coils 73 to 75 varies depending on whether the direction of the magnetic field generated by the excitation current flowing in the coil and the direction of the external magnetic field generated by the rotor 72 are in the same direction or opposite directions. For example, in the state of FIG. 4A, in a case where the excitation current flowed in a direction in which the U phase becomes the N pole, the amount of decrease in the inductance of the coils 73 becomes larger than in the case where the excitation current flowed such that the U phase becomes the S pole. When the direction of the magnetic field generated by the excitation current flowing in a certain coil and the direction of the external magnetic field by the rotor 72 are in the same direction as in the coil 73 in FIG. 4A, the reduction in the inductance of the coil is maximized. As described above, when the motor 152 is stopped, the inductance of each of the coils 73 to 75 changes according to the stop position (rotation phase) of the rotor 72 and the excitation phase.

When the motor 152 is stopped, the position (rotational phase) at which the rotor 72 is stopped is determined according to the combination of the coils excited in the coils 73 to 75 (that is, the excitation phase). For example, when exciting the U-V phase, the excitation current flows from the U-phase coil 73 to the V-phase coil 74, and the U-phase coil 73 becomes the N pole and the V-phase coil 74 becomes the S pole. As a result, the rotor 72 is stopped at the position illustrated in FIG. 4A. Next, when exciting the U-W phase, the excitation current flows from the U-phase coil 73 to the W-phase coil 75, and the U-phase coil 73 becomes the N pole and the W-phase coil 75 becomes the S pole. As a result, the rotor 72 is stopped at the position illustrated in FIG. 4B.

<Position Detection of Rotor 72>

As described above, when the rotor 72 is stopped, the inductance (combined inductance) of an excitation phase that is detected when the excitation phase is excited differs depending on the stop position of the rotor 72. When the inductance of the excitation phase is different, the speed of start up of the excitation current when the excitation current flows to the coil constituting the excitation phase will be different.

Figure 5B:
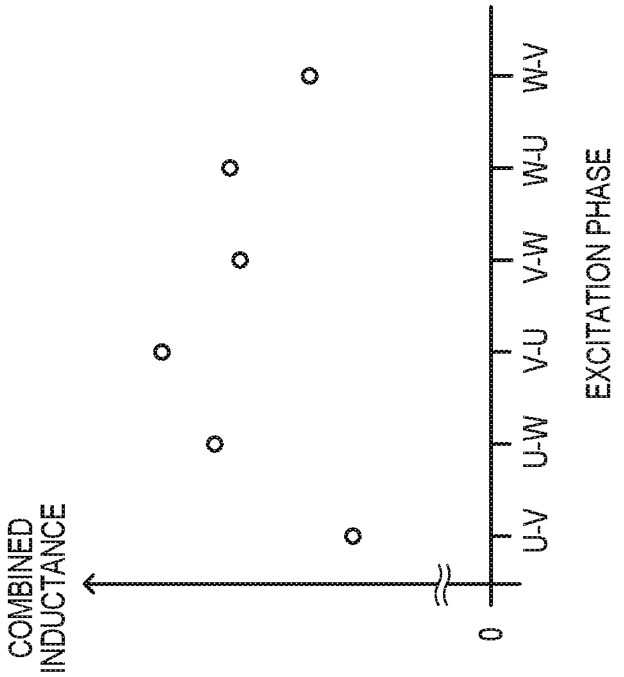
FIG. 5B illustrates an example of detecting an inductance for each excitation phase.
Figure 5A:
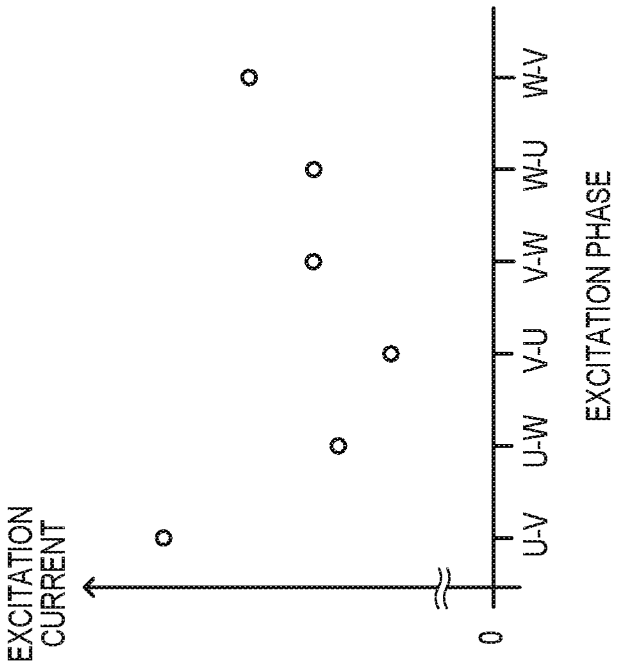
FIG. 5A illustrates an example of detecting a maximum value of an excitation current for each excitation phase.

FIG. 5A and FIG. 5B illustrate an example of detection of a maximum value of an excitation current corresponding to each excitation phase and an inductance of each excitation phase obtained in a case where each excitation phase is excited in order when the rotor 72 is stopped at a position indicated in FIG. 4A. The position illustrated in FIG. 4A corresponds to a position where the rotor 72 is stopped when U-V phase is excited. FIG. 5A illustrates an example of a result of detecting the maximum value of the excitation current obtained by performing excitation for a predetermined time period for each excitation phase in order and measuring an excitation current when each excitation phase is excited. FIG. 5B illustrates an example of a result of detecting the inductance (combined inductance) of each excitation phase corresponding to the result of measuring the excitation current illustrated in FIG. 5A.

When, for example, U-V phase and V-U phase are excited while the rotor 72 is stopped in the position illustrated in FIG. 4A, the inductances of the respective excitation phases and the corresponding maximum values of the excitation currents are detected as follows. Next, when exciting the V-U phase, the excitation current flows from the V-phase coil 74 to the U-phase coil 73, and the V-phase coil 74 becomes the N pole and the U-phase coil 73 becomes the S pole. At this time, as illustrated in FIG. 4A, the N pole of the rotor 72 is opposed to the V-phase coil 74, and the S pole of the rotor 72 is opposed to the U-phase coil 73. In this case, as illustrated in FIG. 5A and FIG. 5B, the inductance of both the V-phase coil 74 and the U-phase coil 73 increases, the inductance of V-U phase becomes maximum, and the maximum value of the excitation current of V-U phase becomes minimum.

Meanwhile, in the case of exciting the U-V phase, since the excitation current flows from the U-phase coil 73 to the V-phase coil 74, the U-phase coil 73 becomes the N pole and the V-phase coil 74 becomes the S pole. At this time, as illustrated in FIG. 4A, the S pole of the rotor 72 is opposed to the U-phase coil 73, and the N pole of the rotor 72 is opposed to the V-phase coil 74. In this case, as illustrated in FIG. 5A and FIG. 5B, the inductance of both the U-phase coil 73 and the V-phase coil 74 decrease, the inductance of the U-V phase becomes minimum, and the maximum value of the excitation current becomes maximum.

Therefore, in the present embodiment, the respective excitation phases are excited in order, and the stop position of the rotor 72 is determined (estimated) based on the relative magnitude relationship of the maximum value (or impedance) of the excitation current, obtained by measuring the excitation current flowing in the coils constituting the respective excitation phases. For example, in the case where the maximum value of the excitation current detected when the U-V phase is excited is larger than the maximum value of the excitation current detected when any of the other excitation phases are excited, it is possible to determine that the rotor 72 stopped at a position (the position illustrated in FIG. 4A) corresponding to the U-V phase.

Comparative Example

Next, with reference to FIG. 12, a comparative example of the drive control of the motors 152 and 153 in the later-described first through fourth embodiments will be described. In this comparative example, the motor 152 is constituted by a sensorless DC brushless motor that lacks a rotor position detection sensor, and the motor 153 is constituted by a stepping motor.

Figure 12:
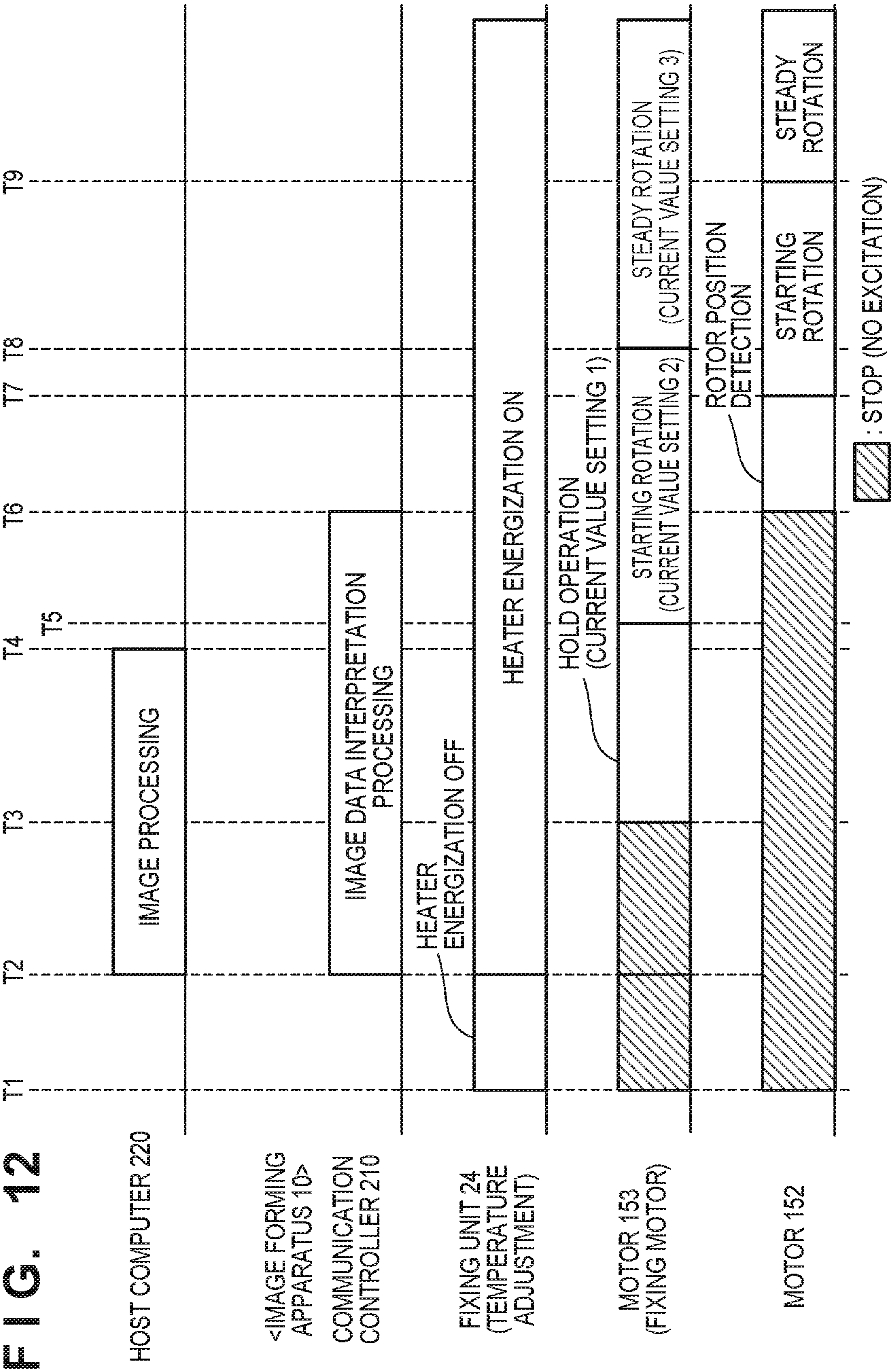
FIG. 12 is a timing chart illustrating the timing of operation of the image forming apparatus (comparative example).

FIG. 12 is a timing chart illustrating the timing of operation of the image forming apparatus 10 in a comparative example. In the comparative example, in the image forming apparatus 10, in order to shorten a first printout time (FPOT), an operation of energizing a heater of the fixing unit 24 may be performed in advance as a preparation operation (pre-start operation) prior to starting the image forming.

As illustrated in FIG. 12, at the timing T1, the energization of the heater of the fixing unit 24 is in the off state, the fixing unit 24 is in a state (stopped state) in which the motor 152 and the motor 153 (fixing motor) are not excited and a rotational operation is not being performed thereon. Thereafter, at the timing T2, the host computer 220 starts the image processing and starts transmitting image data on which the image processing has been performed to the image forming apparatus 10 (the communication controller 210). As a result, the communication controller 210 starts processing for interpreting the image data received from the host computer 220. In addition, the control unit 40 starts energization of the heater of the fixing unit 24 for shortening the FPOT (switches the heater from an off state to an on state). Note that the image processing by the host computer 220 is completed at the timing T4, and the image data interpretation processing by the communication controller 210 is completed at the timing T6.

Next, at the timing T3, the control unit 40 switches the motor 153 (fixing motor) to a hold operation state. This hold operation is a retraction operation for causing the rotor of the motor 153 to rotate to a predetermined rotational position (rotational phase) before starting a starting rotation of the motor 153. At the timing T5, when the hold operation for the motor 153 is completed, the control unit 40 causes the motor control unit 43 to start the starting rotation of the motor 153.

Thereafter, at the timing T8, the operating state of the motor 153 is switched from the starting rotation state to steady rotation.

Meanwhile, in response to completion of the image data interpretation processing by the communication controller 210, an image forming process for forming an image on a sheet based on the data obtained by the interpretation process is started at the timing T6. First, for the motor 152 which is used as a driving source of the image forming unit, the detection of the position of the rotor 72 is started at the timing T6. The position detection operation is completed at the timing T7, and the starting rotation of the motor 152 is started at the timing T7. Thereafter, at the timing T9, the operating state of the motor 152 is switched from the starting rotation state to a steady rotation state.

As described above, the temperature adjustment operation (preparation operation) of the fixing unit 24 is performed prior to the start of the image forming process at the timing T6, and accordingly, the starting rotation of the motor 153 is started at an earlier timing. In this case, in the present comparative example, as illustrated in FIG. 12, the timing of the starting rotation of the motor 153 and the timing of the position detection operation of the motor 152 overlap with each other.

At the time of the starting rotation of the motor 153 for driving the fixing unit 24, a load torque applied to a gear of the motor 153 increases, and therefore, a high current needs to be supplied from the low voltage power supply 120 to (the coil of) the motor 153. Further, during the position detection operation of the motor 152, a high current needs to be supplied from the low voltage power supply 120 to (the coil of) the motor 152. Therefore, when the timing of the starting rotation of the motor 153 and the timing of the position detection operation of the motor 152 overlap each other, the maximum value of the load current supplied from the low voltage power supply 120 becomes excessively large. In this case, the maximum value of the load current may be such a high current value that the cost of the circuit components constituting the low voltage power supply 120 needs to be increased.

<Motor Drive Control>

In order to shorten the FPOT, the image forming apparatus 10 of the present embodiment performs an operation (temperature adjustment operation) of energizing the heater of the fixing unit 24 in advance as a preparation operation (pre-start operation) prior to starting the image forming (printing). The first through fourth embodiments will be described below as examples of driving control of the motors 152 and 153 performed together with the preparation operation in the image forming apparatus 10. The motor 152 is used as a driving source of the image forming unit, and the motor 153 (fixing motor) is used as a driving source of the fixing unit 24.

The motor 152 is constituted by a sensorless DC brushless motor that does not have a rotor position detection sensor in the first through fourth embodiments. Therefore, at the start of the starting rotation of the motor 152, it is necessary to perform a position detection operation for detecting the stop position of the rotor 72 or a retraction operation for rotating the rotor 72 to a predetermined rotational position (rotational phase). The first and third embodiments below illustrate an example in which a position detection operation of the rotor 72 is performed, and the second and fourth embodiments illustrate examples in which a retraction operation of the rotor 72 is performed.

First Embodiment

The first embodiment describes drive control of the motors 152 and 153 in a case where the motor 153 is constituted by a stepping motor, and a retraction operation of the motor 153 and a position detection operation of the motor 152 are performed after the start of the above-described pre-start operation. In the following description, the retraction operation of the motor 153 is referred to as a "hold operation". In the present embodiment, the control unit 40 performs drive control of the motors 152 and 153 so as to perform a position detection operation on the motor 152 before starting the starting rotation of the motor 153 (fixing motor).

Figure 6:
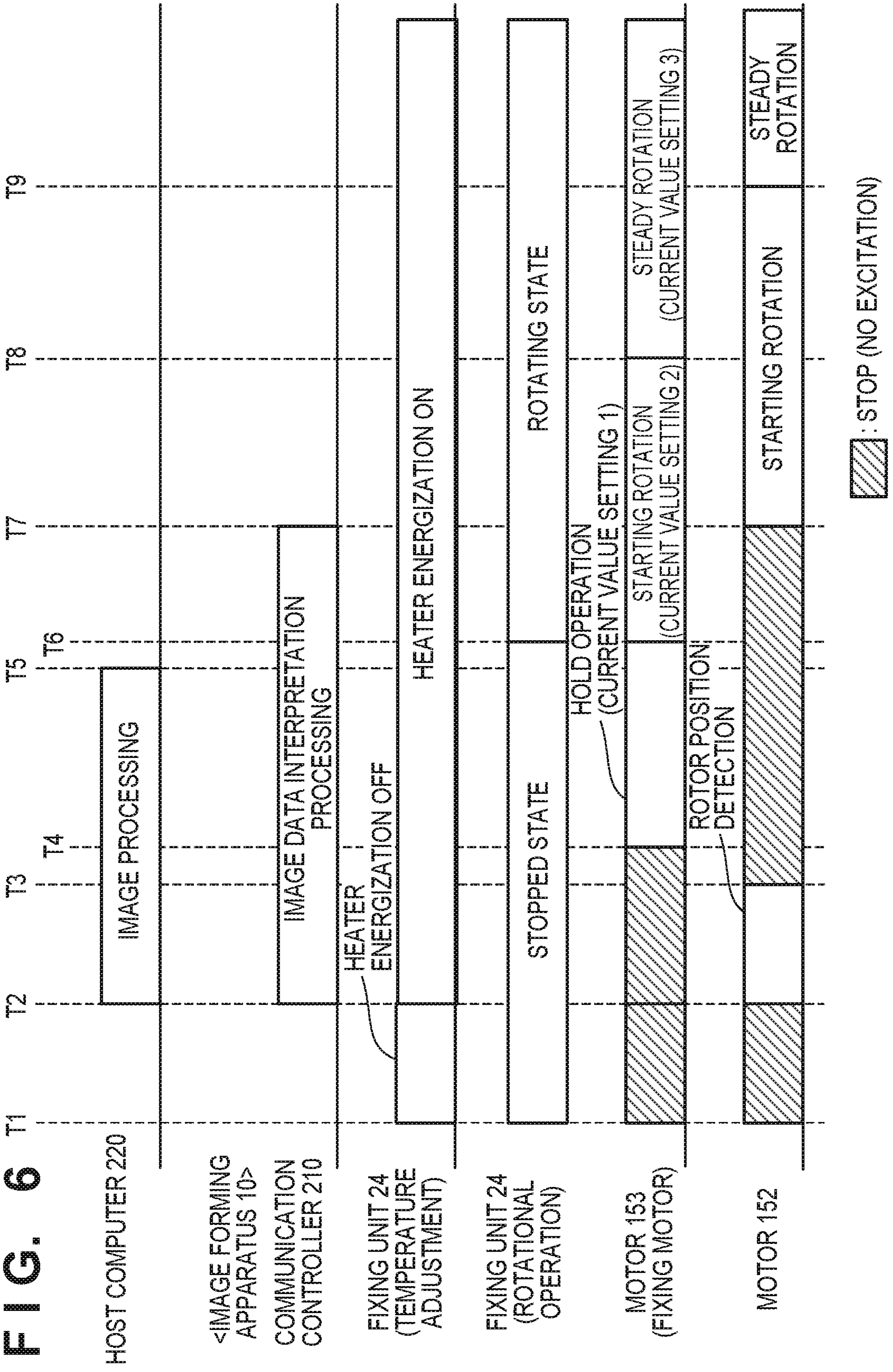
FIG. 6 is a timing chart illustrating the timing of operation of the image forming apparatus according to a first embodiment.

FIG. 6 is a timing chart illustrating an example of the timing of operation of the image forming apparatus 10 in the first embodiment. FIG. 6 illustrates operations of the communication controller 210, the fixing unit 24, the motor 152, and the motor 153 (fixing motor), as for the image forming apparatus 10.

Figure 7:
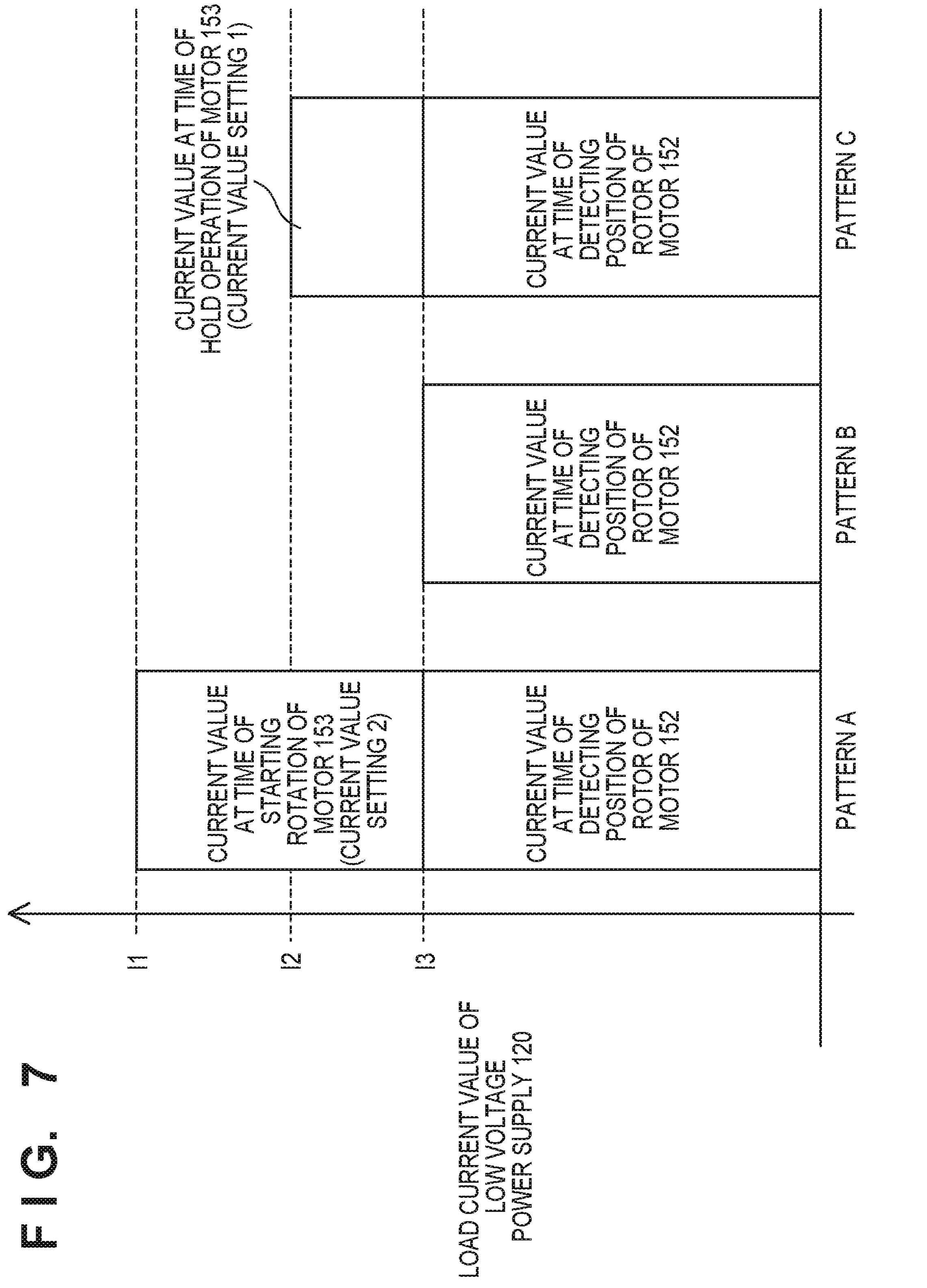
FIG. 7 illustrates an example of a load current value of a low voltage power supply in the image forming apparatus according to the first embodiment.

FIG. 7 illustrates an example of the current value of the load current of the loads (motors 152 and 153) supplied from the low voltage power supply 120 in accordance with the operating states of the motor 152 and the motor 153 in the first embodiment, and illustrates current values in the following three patterns.

- Pattern A: A case where the position of the motor 152 is detected and the motor 153 performs the starting rotation.
- Pattern B: A case where the position of the motor 152 is detected and the motor 153 is stopped.
- Pattern C: A case where the position of the motor 152 is detected and the hold operation for the motor 153 is being performed.

The current values I1, I2 and I3 of the load current supplied from the low voltage power supply 120 in the above-described patterns A to C have the relationship of I1>I2>I3. In particular, the current value I1 may be such a high current value that the cost of the circuit components constituting the low voltage power supply 120 needs to be increased. Therefore, in the present embodiment, as will be described below, in the drive control of the motors 152 and 153, the operating states of the motors 152 and 153 are set to not be as in the pattern A. This prevents the current value of the load current supplied by the low voltage power supply 120 from becoming a high current value such as the current value I1.

As illustrated in FIG. 6, at the timing T1, the energization of the heater of the fixing unit 24 is in the off state, and the fixing unit 24 is in a state (stopped state) in which it is not driven by the motor 153 and the rotational operation is not being performed thereon. In addition, the motors 152 and 153 are in a state in which excitation is not being performed and rotation operation is not being performed thereon (stopped state).

Thereafter, at the timing T2, the host computer 220 starts the image processing and starts transmitting image data on which the image processing has been performed to the image forming apparatus 10 (the communication controller 210). As a result, the communication controller 210 starts processing for interpreting the image data received from the host computer 220. The interpretation process corresponds to a conversion process of converting the received image data into bitmap data (for printing). In addition, the control unit 40 starts energization of the heater of the fixing unit 24 for shortening the FPOT (switches the heater from an off state to an on state). Note that, in the present embodiment, as illustrated in FIG. 6, the image processing by the host computer 220 is completed at the timing T5, and the image data interpretation processing by the communication controller 210 is completed at the timing T7.

In response to reception of the image data from the host computer 220, the control unit 40 starts execution of the position detection operation for the motor 152. Specifically, the control unit 40 starts the position detection operation for detecting the stop position of the rotor 72 for the motor 152 while the motor 153 is stopped (not excited) at the timing T2. As described above, the control unit 40 starts the position detection operation for the motor 152 prior to the timing T4 at which the hold operation for the motor 153 starts.

In the present embodiment, the position detection operation is completed at the timing T3. Therefore, a high current needs to be supplied from the low voltage power supply 120 to (the coil of) the motor 152 in order to execute the position detection operation during the period from the timing T2 to the timing T3. In this embodiment, in this period, the motor 153 is stopped and not excited. Therefore, the current value of the load current supplied by the low voltage power supply 120 can be relatively low, as in the current value I3 illustrated in pattern B of FIG. 7.

After completion of the position detection operation of the motor 152, the control unit 40 switches the motor 153 (fixing motor) into the hold operation state at the timing T4. This hold operation is a retraction operation for causing the rotor of the motor 153 to rotate to a predetermined rotational position (rotational phase) before starting a starting rotation of the motor 153. The control unit 40 performs the hold operation for the motor 153 using a current value setting 1. In the present embodiment, the hold operation is completed at the timing T6. At the timing T6, when the hold operation for the motor 153 is completed, the control unit 40 causes the motor control unit 43 to start the starting rotation of the motor 153 using a current value setting 2.

As described above, the motor 153 (fixing motor) functions as a driving source for driving the fixing unit 24. At the time of the starting rotation of the fixing unit 24, a load torque applied to a gear of the motor 153 increases, and therefore, a high current needs to be supplied from the low voltage power supply 120 to (the coil of) the motor 153. Therefore, as illustrated in FIG. 7, the current value setting 2 corresponds to a current value with such a high current.

However, in the present embodiment, the control unit 40 performs drive control of the motors 152 and 153 so that the timing of the starting rotation of the motor 153 and the timing of the position detection operation of the motor 152 do not overlap with each other. Therefore, it is possible to prevent the current value of the load current supplied by the low voltage power supply 120 from becoming a high current value as with the current value I1 illustrated in pattern A of FIG. 7.

In the present embodiment, during execution of the starting rotation of the motor 153 (during the period from the timing T6 to the timing T8), the image data interpretation processing by the communication controller 210 is completed at the timing T7. In response to completion of the interpretation process, the control unit 40 causes the motor control unit 42 to start the starting rotation of the motor 152 at the timing T7, together with starting a print process (image forming process) of forming an image on the sheet based on the data obtained in the interpretation process.

Thereafter, at the timing T8, the operating state of the motor 153 is switched from the starting rotation state to steady rotation according to a current value setting 3. Normally, the current value corresponding to the current value setting 3 at the time of steady rotation is smaller than the current value corresponding to the current value setting 2 at the time of starting rotation. Also, at the timing T9 subsequent to the timing T8, the operating state of the motor 152 is switched from the starting rotation state to a steady rotation state.

As described above, in the present embodiment, the control unit 40 performs drive control of the motors 152 and 153 so that the timing of the starting rotation of the motor 153 and the timing of the position detection operation of the motor 152 do not overlap with each other. Therefore, it is possible to prevent the current value of the load current supplied by the low voltage power supply 120 from becoming a high current value as with the current value I1 illustrated in pattern A of FIG. 7. Accordingly, by virtue of this embodiment, it is possible to reduce the maximum load current value of the low voltage power supply 120 while reducing the FPOT, and it is possible to prevent an increase in the cost of the circuitry constituting the low voltage power supply 120 due to an increase in the maximum load current value.

In the present embodiment, the position detection operation for the motor 152 is started at the timing T2 illustrated in FIG. 6, but the start timing of the position detection operation is not limited thereto. For example, the position detection operation may be started at a timing between the timing T2 and the timing T4. In this case, the timing of the hold operation for the motor 153 may overlap with the timing of the position detection operation for the motor 152. However, in this case, the current value of the load current supplied by the low voltage power supply 120 can be a relatively low value, as in the current value I3 illustrated in pattern B of FIG. 7. Specifically, it is possible to prevent the current value of the load current supplied by the low voltage power supply 120 from becoming a high current value as with the current value I1 illustrated in pattern A of FIG. 7.

Second Embodiment

The second embodiment describes drive control of the motors 152 and 153 in a case where the motor 153 is constituted by a stepping motor, and the hold operation (retraction operation) for the motor 153 and retraction of the motor 152 are performed after the start of the above-described pre-start operation. In the present embodiment, similarly to the first embodiment, the control unit 40 performs drive control of the motors 152 and 153 so as to perform a retraction operation on the rotor 72 of the motor 152 before starting the starting rotation of the motor 153 (fixing motor). Hereinafter, differences from the first embodiment will be mainly described.

Figure 8:
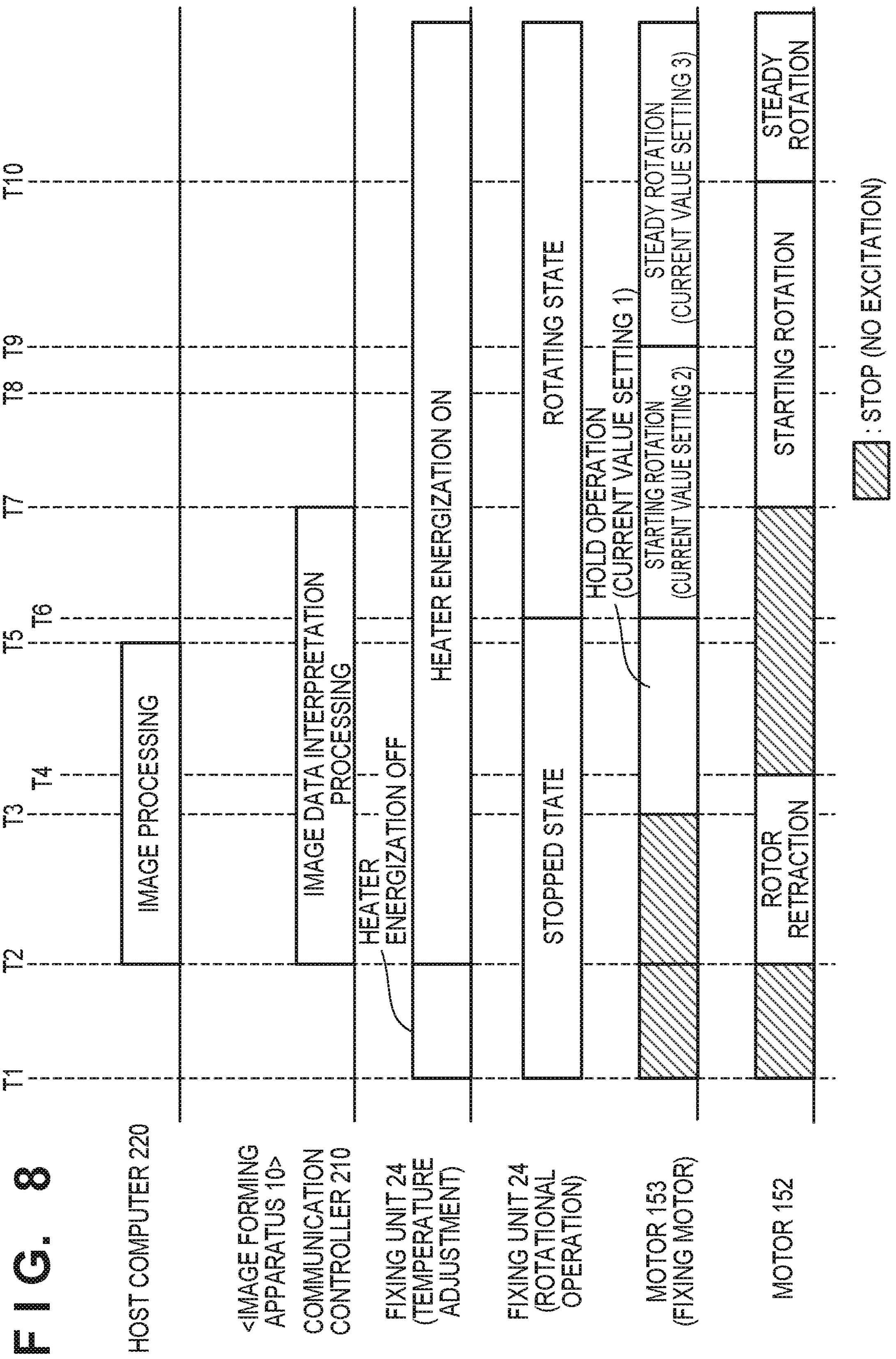
FIG. 8 is a timing chart illustrating the timing of operation of the image forming apparatus according to a second embodiment.

FIG. 8 is a timing chart illustrating an example of the timing of operation of the image forming apparatus 10 in the second embodiment. FIG. 8 illustrates operations of the communication controller 210, the fixing unit 24, the motor 152, and the motor 153 (fixing motor), as for the image forming apparatus 10.

Figure 9:
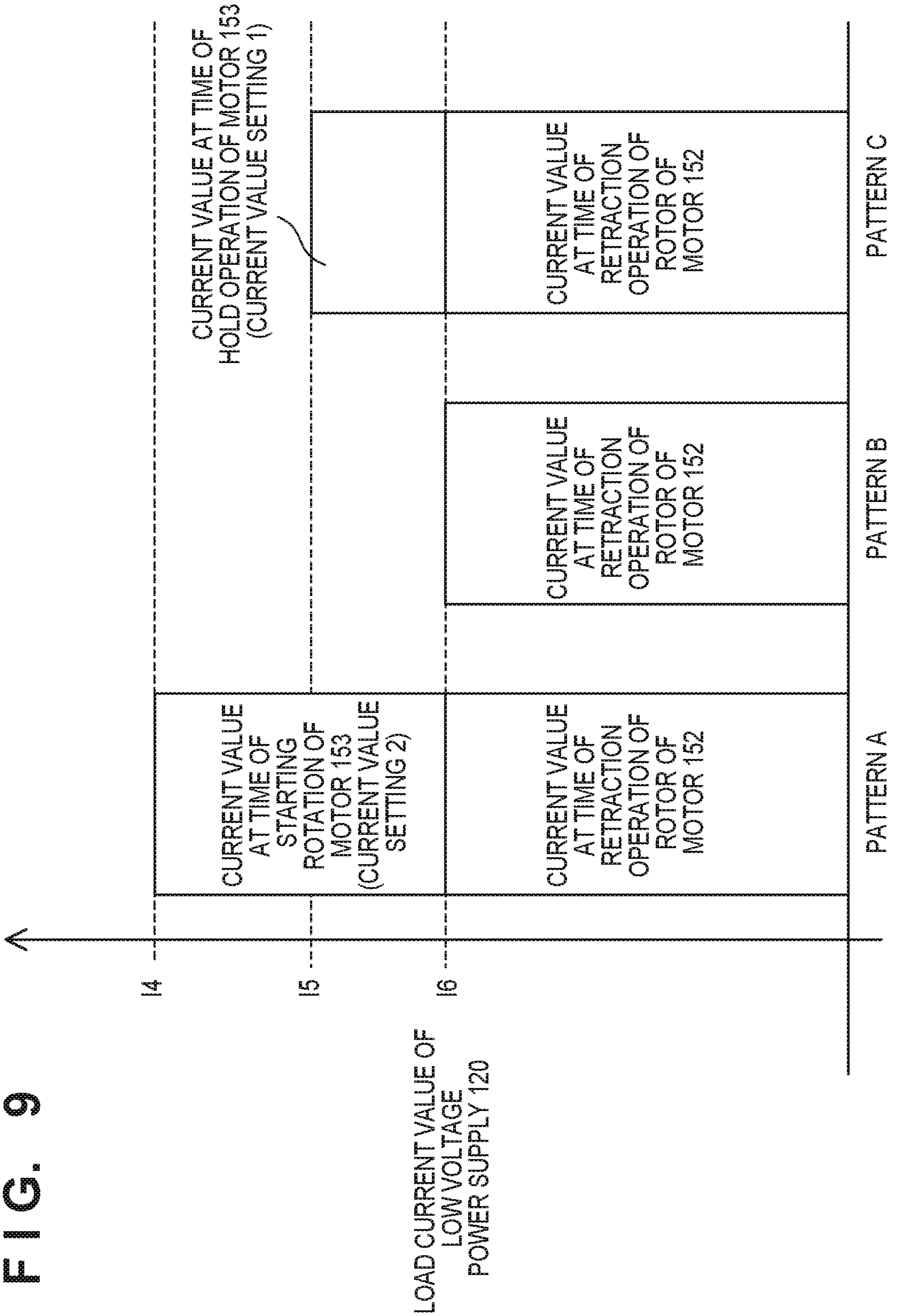
FIG. 9 illustrates an example of load current values of a low voltage power supply in the image forming apparatus according to the second embodiment.

Here, FIG. 9 illustrates an example of current values of the load current of the loads (motors 152 and 153) supplied from the low voltage power supply 120 in accordance with the operating states of the motor 152 and the motor 153 in the second embodiment, and illustrates current values in the following three patterns.

Pattern A: A case where a retraction operation is performed on the motor 152 and the motor 153 performs the starting rotation.

Pattern B: A case where a retraction operation is performed on the motor 152 and the motor 153 is stopped.

Pattern C: A case where a retraction operation is performed on the motor 152 and the hold operation for the motor 153 is being performed.

The current values I4, I5 and I6 of the load current supplied from the low voltage power supply 120 in the above-described patterns A to C have the relationship of I4>I5>I6. In particular, the current value I4 may be a high current value such that the cost of the circuit components constituting the low voltage power supply 120 needs to be increased. Therefore, in the present embodiment, as will be described below, in the drive control of the motors 152 and 153, the operating states of the motors 152 and 153 are set to not be as in the pattern A. This prevents the current value of the load current supplied by the low voltage power supply 120 from becoming a high current value such as the current value I4.

As illustrated in FIG. 8, at the timing T1, the energization of the heater of the fixing unit 24 is in the off state, and the fixing unit 24 is in a state (stopped state) in which it is not driven by the motor 153 and the rotational operation is not being performed. In addition, the motors 152 and 153 are in a state in which excitation is not being performed and the rotation operation is not being performed thereon (stopped state).

Thereafter, similarly to the first embodiment, at the timing T2, the host computer 220 starts the image processing and starts transmitting image data on which the image processing has been performed to the image forming apparatus 10 (the communication controller 210). As a result, the communication controller 210 starts processing for interpreting the image data received from the host computer 220. In addition, the control unit 40 starts energization of the heater of the fixing unit 24 for shortening the FPOT (switches the heater from an off state to an on state). Note that, similarly to the first embodiment, the image processing by the host computer 220 is completed at the timing T5, and the image data interpretation processing by the communication controller 210 is completed at the timing T7.

In response to reception of the image data from the host computer 220, the control unit 40 starts execution of the retraction operation for the motor 152. Specifically, the control unit 40 starts the retraction operation on the rotor 72 of the motor 152 while the motor 153 is stopped (not excited) at the timing T2. As described above, the control unit 40 starts the retraction operation on the motor 152 prior to the timing T4 at which the hold operation for the motor 153 starts.

Specifically, the motor control unit 42 starts the U-V phase excitation of the motor 152 at the timing T2 in accordance with an instruction from the control unit 40, for example, and ends the U-V phase excitation at the timing T4. Thus, the rotor 72 of the motor 152 is stopped at a position corresponding to the U-V phase (a position illustrated in FIG. 4A). In this way, a retraction operation is performed to rotate the rotor 72 to a position corresponding to the U-V phase.

In order to realize this retraction operation, a high current needs to be supplied from the low voltage power supply 120 to (the coil of) the motor 152 depending on the specifications of the windings (coils) 73 to 75 and the rotor 72 or the like of the motor 152. However, during a period from the timing T2 to the timing T4, during which the retraction operation for the motor 152 is performed, the motor 153 is stopped and not excited or is in a state in which the hold operation is being performed. Therefore, the current value of the load current supplied by the low voltage power supply 120 can be relatively low, as in the current value I6 illustrated in pattern B of FIG. 9 or the current value I5 illustrated in the pattern C.

In the present embodiment, the control unit 40 switches the motor 153 (fixing motor) to the hold operation state at the timing T3 during execution of the retraction operation for the motor 152. Similarly to the first embodiment, this hold operation is a retraction operation for causing the rotor of the motor 153 to rotate to a predetermined rotational position (rotational phase) before starting a starting rotation of the motor 153. The control unit 40 performs a hold operation for the motor 153 using a current value setting 1. At the timing T6, when the hold operation for the motor 153 is completed, the control unit 40 causes the motor control unit 43 to start the starting rotation of the motor 153 using a current value setting 2.

In the present embodiment, the control unit 40 performs drive control of the motors 152 and 153 so that the timing of the starting rotation of the motor 153 and the timing of the retraction operation of the motor 152 do not overlap with each other. Therefore, it is possible to prevent the current value of the load current supplied by the low voltage power supply 120 from becoming a high current value as with the current value I4 illustrated in pattern A of FIG. 9.

In the present embodiment, similarly to the first embodiment, during execution of the starting rotation of the motor 153 (during the period from the timing T6 to the timing T8), the image data interpretation processing by the communication controller 210 is completed at the timing T7. In response to completion of the interpretation process, the control unit 40 causes the motor control unit 42 to start the starting rotation of the motor 152 at the timing T7, together with starting a print process (image forming process) for forming an image on the sheet based on the data obtained in the interpretation process.

Thereafter, similarly to the first embodiment, at the timing T8, the operating state of the motor 153 is switched from the starting rotation state to steady rotation by the current value setting 3. Also, at the timing T9 subsequent to the timing T8, the operating state of the motor 152 is switched from the starting rotation state to a steady rotation state.

As described above, in the present embodiment, the control unit 40 performs drive control of the motors 152 and 153 so that the timing of the starting rotation of the motor 153 and the timing of the retraction operation of the motor 152 do not overlap with each other. Therefore, it is possible to prevent the current value of the load current supplied by the low voltage power supply 120 from becoming a high current value as with the current value I4 illustrated in pattern A of FIG. 9. Accordingly, similarly to the first embodiment, it is possible to reduce the maximum load current value of the low voltage power supply 120 while reducing the FPOT, and it is possible to prevent an increase in the cost of the circuitry constituting the low voltage power supply 120 due to an increase in the maximum load current value.

In the present embodiment, the retraction operation for the motor 152 is started at the timing T2 illustrated in FIG. 8, but the start timing of the retraction operation is not limited thereto. For example, the retraction operation may be started at a timing between the timing T2 and the timing T3.

Further, in the present embodiment, in the retraction operation for the motor 152, the excitation of the predetermined excitation phase (U-V phase) is performed only once, but the number of excitations is not limited to this. For example, after excitation of a predetermined excitation phase (U-V phase), excitation of a different excitation phase (e.g., U-W phase) may be performed.

Third Embodiment

In the third embodiment, the motor 153 is constituted by a sensorless DC brushless motor that lacks a rotor position detection sensor, and the third embodiment differs from the first embodiment in that there is no need to perform the hold operation for the motor 153. In the third embodiment, drive control of the motors 152 and 153 in a case where the position detection operation of the motor 152 is performed after the start of the above-described pre-start operation will be described. Hereinafter, differences from the first embodiment will be mainly described.

Figure 10:
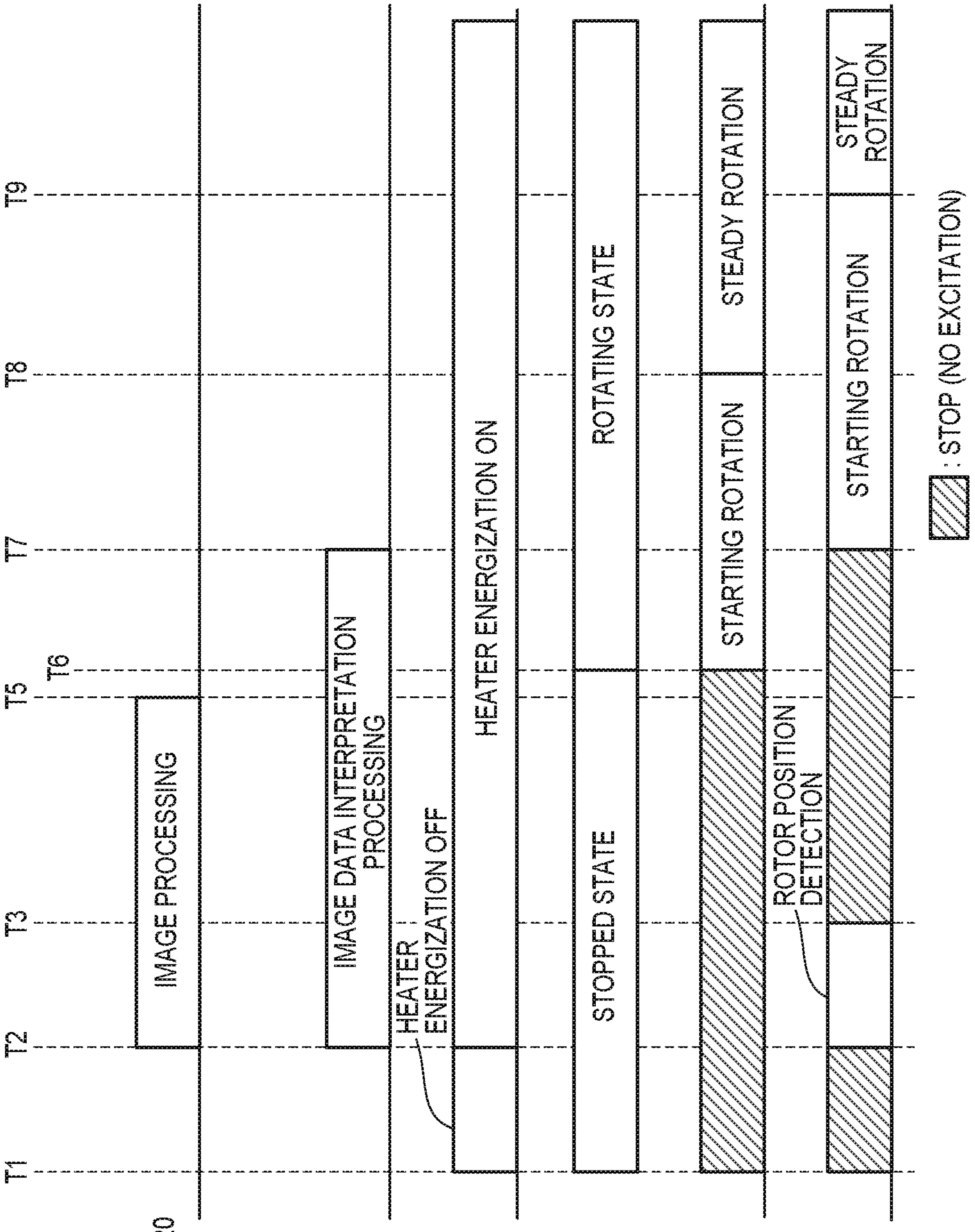
FIG. 10 is a timing chart illustrating the timing of operation of the image forming apparatus according to a third embodiment.

FIG. 10 is a timing chart illustrating an example of the timing of operation of the image forming apparatus 10 in the third embodiment. FIG. 10, similarly to FIG. 6 (the first embodiment), illustrates operations of the communication controller 210, the fixing unit 24, the motor 152, and the motor 153 (fixing motor), as for the image forming apparatus 10.

As illustrated in FIG. 10, the control unit 40 of the present embodiment starts the position detection operation for the motor 152, prior to the start timing T6 of the starting rotation of the motor 153 while the motor 153 is stopped (not excited), at the timing T2 similarly to the first embodiment (FIG. 6). In addition, similarly to the first embodiment, the control unit 40 causes the motor control unit 43 to start the starting rotation of the motor 153 at the timing T6 after the completion of the position detection operation. In this way, similarly to the first embodiment, the control unit 40 performs drive control of the motors 152 and 153 so that the timing of the starting rotation of the motor 153 and the timing of the position detection operation of the motor 152 do not overlap with each other. Accordingly, it is possible to prevent the current value of the load current supplied by the low voltage power supply 120 from becoming a high current value.

As described above, by virtue of this embodiment, similarly to the first embodiment, the maximum load current value of the low voltage power supply 120 can be reduced while the FPOT is shortened, and an increase in the cost of the circuitry constituting the low voltage power supply 120 accompanying an increase in the maximum load current value can be prevented.

In the present embodiment, the position detection operation for the motor 152 is started at the timing T2 illustrated in FIG. 10, but the start timing of the position detection operation is not limited thereto. For example, the timing at which the position detection operation is started may be determined so that the position detection operation is completed by the timing T6 after the timing T2.

Fourth Embodiment

In the fourth embodiment, the motor 153 is constituted by a sensorless DC brushless motor that lacks a rotor position detection sensor, and the fourth embodiment differs from the second embodiment in that there is no need to perform the hold operation for the motor 153. In the fourth embodiment, the drive control of the motors 152 and 153 in the case where the retraction operation on the motor 152 is performed after the start of the above-described pre-start operation will be described. Hereinafter, differences from the second embodiment will be mainly described.

Figure 11:
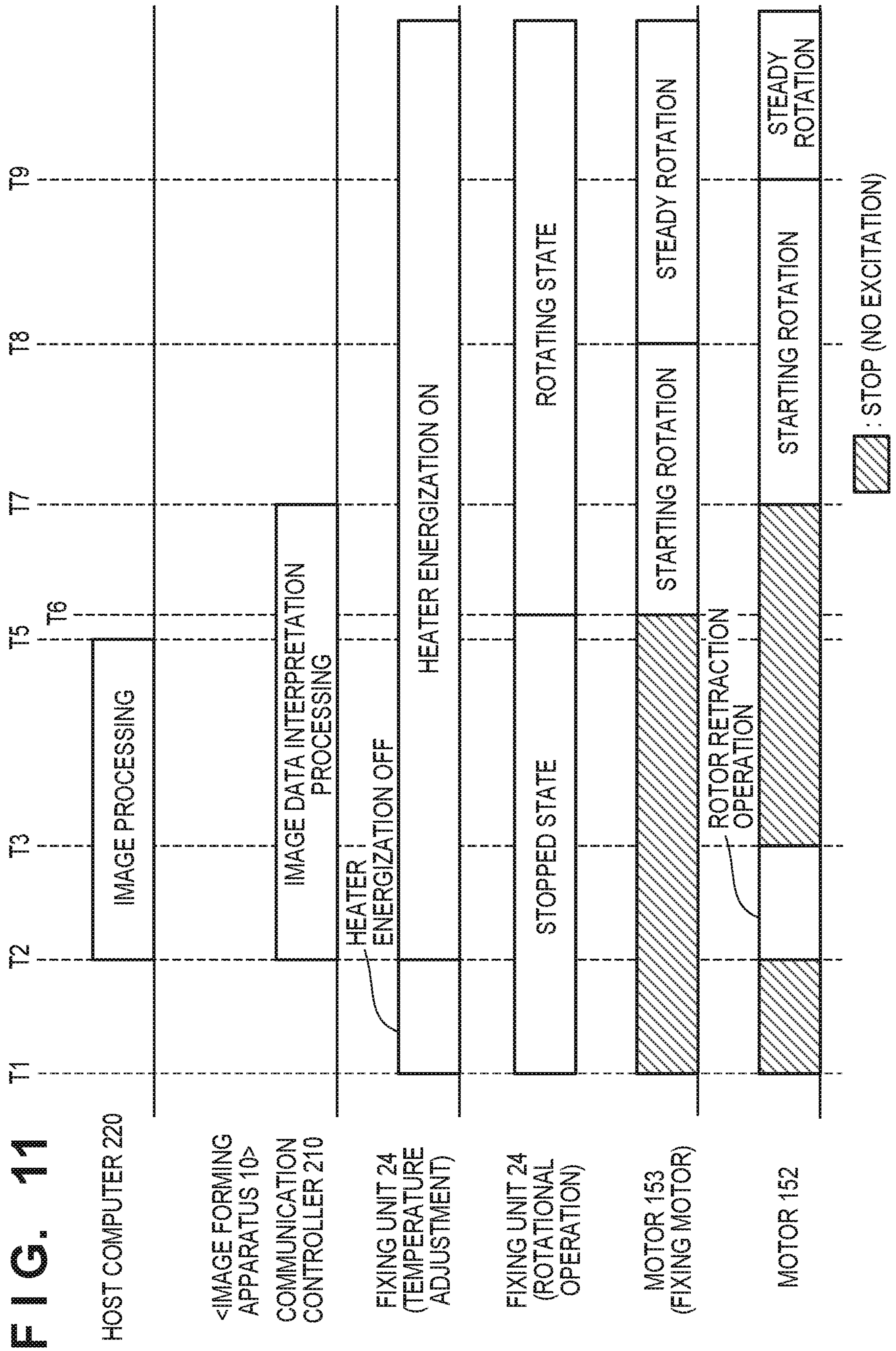
FIG. 11 is a timing chart illustrating the timing of operation of the image forming apparatus according to a fourth embodiment.

FIG. 11 is a timing chart illustrating an example of the timing of operation of the image forming apparatus 10 in the fourth embodiment. FIG. 11, similarly to FIG. 8 (the second embodiment), illustrates operations of the communication controller 210, the fixing unit 24, the motor 152, and the motor 153 (fixing motor) in the image forming apparatus 10.

As illustrated in FIG. 11, the control unit 40 of the present embodiment starts the retraction operation on the motor 152 prior to the start timing T6 of the starting rotation of the motor 153 while the motor 153 is stopped (not excited) at the timing T2 similarly to the second embodiment (FIG. 8). In addition, similarly to the second embodiment, the control unit 40 causes the motor control unit 43 to start the starting rotation of the motor 153 at the timing T6 after the completion of the retraction operation. In this way, similarly to the second embodiment, the control unit 40 performs drive control of the motors 152 and 153 so that the timing of the starting rotation of the motor 153 and the timing of the retraction operation of the motor 152 do not overlap with each other. Accordingly, it is possible to prevent the current value of the load current supplied by the low voltage power supply 120 from becoming a high current value.

As described above, by virtue of this embodiment, similarly to the second embodiment, the maximum load current value of the low voltage power supply 120 can be reduced while the FPOT is shortened, and an increase in the cost of the circuitry constituting the low voltage power supply 120 accompanying an increase in the maximum load current value can be prevented.

In the present embodiment, the retraction operation for the motor 152 is started at the timing T2 illustrated in FIG. 11, but the start timing of the retraction operation is not limited thereto. For example, the timing at which the retraction operation is started may be determined so that the retraction operation is completed by the timing T6 after the timing T2. In addition, similarly to the second embodiment, the number of times of excitation of a predetermined excitation phase (U-V phase) in the retraction operation of the motor 152 may also be arbitrarily determined.

SUMMARY

The image forming apparatus 10 according to the above-described embodiments including the first through fourth embodiments includes the image forming unit which forms a toner image on a sheet, the fixing unit 24 which fixes the toner image formed on the sheet to the sheet, and the motor 152 (first motor) and the motor 153 (second motor). The motor 152 (first motor) is constituted by a motor of a type that lacks a sensor for detecting the rotational position of the rotor of the motor 152, and drives the image forming unit. The motor 153 (second motor) drives the fixing unit 24. The control unit 40 performs drive control of the motors 152 and 153 so that the execution timing of the position detection operation (first operation) for detecting the rotational position of the motor 152 or the retraction operation (second operation) for rotating the rotor to a predetermined rotational position does not overlap the timing for starting rotational driving of the motor 153, before the image formation by the image forming unit starts. For example, the control unit 40 starts the position detection operation or the retraction operation so that the position detection operation or the retraction operation of the motor 152 (the first motor) is completed before the start of the rotational driving of the motor 153 (the second motor).

According to the present embodiments, in the image forming apparatus 10 in which the sensorless motor 152 is used, when a preparation operation for shortening the FPOT is performed, the maximum value of load current of the power supply (the low voltage power supply 120) can be prevented from becoming excessively large. Therefore, it is possible to prevent an increase in the cost of the circuit constituting the low voltage power supply 120 due to an increase in the maximum load current value.

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-062240 filed Apr. 6, 2023, which is hereby incorporated by reference herein in its entirety.

What is claimed is:

1. An image forming apparatus comprising:

an image forming unit configured to form a toner image on a sheet based on image data for image formation received from an external apparatus;

a fixing unit configured to fix the toner image formed on the sheet onto the sheet;

a first motor configured to drive the image forming unit, the first motor being of a type that lacks a sensor for detecting a rotational position of a rotor of the first motor;

a second motor configured to drive the fixing unit; and a control unit configured to control the first motor and the second motor so as to perform, between when the image data is received until when image formation by the image forming unit is started, a first operation for detecting the rotational position of the first motor or a second operation for causing the rotor to rotate to a predetermined rotational position, and rotational driving of the second motor, wherein the control unit causes the rotational driving of the second motor to start after completion of the first operation or the second operation such that an execution timing of the first operation or the second operation and a timing at which the rotational driving of the second motor is started do not overlap.

2. The image forming apparatus according to claim 1, wherein the control unit, in response to reception of the image data, causes execution of the first operation or the second operation to start.

3. The image forming apparatus according to claim 2, wherein the control unit, in response to reception of the image data, causes execution of a temperature adjustment operation of the fixing unit to start together with causing execution of the first operation or the second operation to start.

4. The image forming apparatus according to claim 3, wherein when a conversion process for converting image data into bitmap data completes, the control unit causes image formation by the image forming unit to start by causing the rotational driving of the first motor to start, and prior to a start of the rotational driving of the first motor, the control unit causes the rotational driving of the second motor to start.

5. The image forming apparatus according to claim 2, wherein the control unit, in response to reception of the image data, causes execution of a temperature adjustment operation of the fixing unit to start, and after the start of the temperature adjustment operation and before a start timing of a retraction operation for causing a rotor of the second motor to rotate to a predetermined rotational position, causes execution of the first operation or the second operation to start.

6. The image forming apparatus according to claim 1, wherein the second motor is of a type that lacks a sensor for detecting a rotational position of a rotor of the second motor, and the control unit, before the start of a retraction operation for causing the rotor of the second motor to rotate to a predetermined rotational position, causes execution of the first operation or the second operation to start.

7. The image forming apparatus according to claim 6, wherein the control unit causes execution of the first operation or the second operation to start such that execution of the first operation or the second operation completes during execution of the retraction operation for the second motor at the latest.

8. The image forming apparatus according to claim 1, wherein the second motor is of a type that has a sensor for detecting a rotational position of a rotor of the second motor, and the control unit, prior to the start of the rotational driving of the second motor, causes execution of the first operation or the second operation to start.

9. The image forming apparatus according to claim 1, wherein the first motor is configured to rotationally drive a rotating member of the image forming unit, and the second motor is configured to rotationally drive a rotating member of the fixing unit.

10. The image forming apparatus according to claim 1, wherein the first motor and the second motor are driven by a direct current outputted from a common power supply.

* * * * *